(12) United States Patent
Wixwat et al.

(10) Patent No.: US 9,808,770 B2
(45) Date of Patent: Nov. 7, 2017

(54) HIGH THROUGHPUT MEMBRANE WITH CHANNELS

(71) Applicant: Pall Corporation, Port Washington, NY (US)

(72) Inventors: Wilfrid Klaus Wixwat, Pensacola, FL (US); Binbing Han, Pensacola, FL (US)

(73) Assignee: Pall Corporation, Port Washington ( * ) Notice: Subject to any disclaimer, the term of this patent is extended or adjusted under 35 U.S.C. 154(b) by 86 days.

(21) Appl. No.: 13/894,210

(22) Filed: May 14, 2013

(65) Prior Publication Data

US 2014/0339166 A1    Nov. 20, 2014

(51) Int. Cl.
*B01D 69/02* (2006.01)
*B01D 67/00* (2006.01)
*B01D 69/12* (2006.01)

(52) U.S. Cl.
CPC .......... *B01D 69/02* (2013.01); *B01D 67/003* (2013.01); *B01D 67/0011* (2013.01); *B01D 67/0013* (2013.01); *B01D 69/12* (2013.01); *B01D 2323/18* (2013.01); *B01D 2325/02* (2013.01)

(58) Field of Classification Search
None
See application file for complete search history.

(56) References Cited

U.S. PATENT DOCUMENTS

| | | | |
|---|---|---|---|
| 3,890,417 A | 6/1975 | Vallance | |
| 4,289,600 A | 9/1981 | Lazarz et al. | |
| 5,514,378 A | 5/1996 | Mikos et al. | |
| 5,620,790 A * | 4/1997 | Holzki | B01D 67/0011 210/500.27 |
| 5,938,874 A * | 8/1999 | Palomo et al. | 156/73.1 |
| 6,245,698 B1 | 6/2001 | Pope et al. | |
| 6,413,070 B1 | 7/2002 | Meyering et al. | |
| 7,182,894 B2 | 2/2007 | Pandian et al. | |
| 2002/0127387 A1 | 9/2002 | Sale et al. | |
| 2003/0214066 A1* | 11/2003 | Kools | B01D 67/0009 264/40.1 |
| 2004/0154978 A1 | 8/2004 | Sale et al. | |
| 2004/0245172 A1* | 12/2004 | Petersen | B01D 39/1676 210/510.1 |
| 2007/0084788 A1* | 4/2007 | Moya | A61L 2/0017 210/500.29 |

(Continued)

FOREIGN PATENT DOCUMENTS

| | | |
|---|---|---|
| DE | 10058285 A1 | 7/2001 |
| DE | 10058258 A1 | 8/2002 |

(Continued)

OTHER PUBLICATIONS

Extended European Search Report, Application No. 14167331.9 dated Oct. 1, 2014.

(Continued)

*Primary Examiner* — Krishnan S Menon
*Assistant Examiner* — Ryan B Huang
(74) *Attorney, Agent, or Firm* — Leydig Voit & Mayer (57) ABSTRACT

Membranes having first and second porous portions, wherein the first portion has a more open pore structure than the second portion, wherein the first porous portion includes channels prepared by removing introduced fibers, as well as methods of making and using the membranes, are disclosed.

10 Claims, 3 Drawing Sheets

(56) References Cited

U.S. PATENT DOCUMENTS

| | | |
|---|---|---|
| 2007/0104941 A1 | 5/2007 | Kameda et al. |
| 2008/0241503 A1 | 10/2008 | Romdhane et al. |
| 2010/0126133 A1 | 5/2010 | Fekety et al. |
| 2010/0155325 A1* | 6/2010 | Zhang ................ B01D 39/1692 210/500.21 |
| 2011/0217539 A1* | 9/2011 | Bonner et al. ............. 428/314.2 |
| 2013/0056420 A1 | 3/2013 | Wang et al. |

FOREIGN PATENT DOCUMENTS

| | | |
|---|---|---|
| DE | 102006010831 A1 | 9/2007 |
| DE | 102006036863 A1 | 2/2008 |
| EP | 0 477 689 A1 | 4/1992 |
| EP | 0477689 A1 | 4/1992 |
| EP | 2476724 A1 | 7/2012 |
| JP | 53-090067 A2 | 8/1978 |
| JP | 61-502902 A | 12/1986 |
| JP | 63-291621 A2 | 11/1988 |
| JP | 2006-239680 A2 | 9/2006 |
| JP | 2006-326427 A2 | 12/2006 |
| JP | 2007-126341 A | 5/2007 |
| JP | 2012-509764 A | 4/2012 |
| JP | 2013-052387 A2 | 3/2013 |
| WO | WO 2005063365 A1 | 7/2005 |
| WO | WO 2007/133609 A2 | 11/2007 |
| WO | WO 2009/060836 A1 | 5/2009 |
| WO | WO 2011/149744 A1 | 12/2011 |
| WO | WO 2013/012024 A1 | 1/2013 |
| WO | WO 2009024973 A1 | 2/2013 |

OTHER PUBLICATIONS

Search Report, Singapore Application No. 10201401357X, dated Sep. 12, 2014.

* cited by examiner

HIGH THROUGHPUT MEMBRANE WITH CHANNELS

BACKGROUND OF THE INVENTION

Polymeric membranes are used to filter a variety of fluids. However, there is a need for membranes that provide high throughput performance.

The present invention provides for ameliorating at least some of the disadvantages of the prior art. These and other advantages of the present invention will be apparent from the description as set forth below.

BRIEF SUMMARY OF THE INVENTION

An embodiment of the invention provides a membrane having first and second porous portions, wherein the first portion has a more open pore structure than the second portion, wherein the first porous portion includes channels prepared by removing introduced fibers (e.g., by leaching). In one embodiment, the membrane provides for sterile filtration.

In another embodiment, a polymeric microporous membrane is provided comprising (a) a first microporous surface; (b) a second microporous surface; and (c) a bulk between the first surface and the second surface; wherein the bulk comprises a first porous portion including the first microporous surface, and a second porous portion including the second microporous surface; and (i) the first portion comprises at least first and second sets of different controlled pore structures, the first set of pore structures comprising channels; and (ii) the second portion comprises a third set of a controlled pore structures, wherein the third set of pore structures has a smaller average pore size than the second set of controlled pore structures, Typically, the membrane comprises at least first and second layers integrally bonded to one another, the first layer comprising the first porous portion, and the second layer comprising the second porous portion. In a preferred embodiment, the first set of controlled pore structures is prepared by introducing fibers, and leaching the fibers, and forming the first porous portion. Typically, the first set of controlled pore structures comprises channels having an aspect ratio of length to diameter of at least about 4.

In other embodiments, methods of making the membranes, methods of using the membranes, and devices including the membranes, are provided by the invention.

BRIEF DESCRIPTION OF THE SEVERAL VIEWS OF THE DRAWING(S)

FIG. 1 shows SEM cross-sectional views of a membrane according to an embodiment of the present invention.

FIG. 2 (FIGS. 2A-2C) shows SEM cross-sectional views of other embodiments of membranes according to the present invention, wherein FIGS. 2A and 2B show entangled channels.

DETAILED DESCRIPTION OF THE INVENTION

In accordance with an embodiment of the present invention, a membrane is provided having first and second porous portions, wherein the first portion has a more open pore structure than the second portion, and wherein the first porous portion includes channels by removing introduced fibers.

In another embodiment, a polymeric microporous membrane is provided comprising (a) a first microporous surface; (b) a second microporous surface; and (c) a bulk between the first surface and the second surface; wherein the bulk comprises a first porous portion including the first microporous surface, and a second porous portion including the second microporous surface; and (i) the first portion comprises at least first and second sets of different controlled pore structures, the first set of pore structures comprising channels; and (ii) the second portion comprises a third set of a controlled pore structures, wherein the third set of pore structures has a smaller average pore size than the second set of controlled pore structures. Typically, the membrane comprises at least first and second layers integrally bonded to one another, the first layer comprising the first porous portion, and the second layer comprising the second porous portion. In a preferred embodiment, the first set of controlled pore structures are prepared by introducing fibers, and removing (e.g., leaching) the fibers, in preparing the first porous portion. Typically, the first set of controlled pore structures comprises channels having an aspect ratio of length to diameter of at least about 4, for example, in the range of about 4 to about 20, preferably, in the range of about 5 to about 15.

In a typical embodiment, the membrane comprises at least two layers, integrally bound to each other, e.g., so that the membrane does not delaminate under typical process conditions.

Typically, the first portion of the membrane comprises a thickness in the range of from about 25% to about 80% of the total thickness of the layer, and the second portion of the membrane comprises a thickness in the range of from about 75% to about 20% of the total thickness of the layer; more preferably, the first portion of the membrane comprises a thickness in the range of from about 50% to about 70% of the total thickness of the membrane, and the second portion of the membrane comprises a thickness in the range of from about 50% to about 30% of the total thickness of the membrane.

In accordance with the invention, membranes are provided having pore structures that can be optimized for particular applications. For example, solid fibers of desired size(s) are introduced while the membrane is being produced, and the fibers are subsequently removed (e.g., dissolved), providing the first set of controlled pore structures, e.g., channels having a range of predetermined dimension(s), while also forming the second set of controlled pore structures, e.g., pores of predetermined size (resulting from phase inversion without the presence of fibers) in the more upstream portion of the membrane (the first porous portion of the membrane), allowing lateral flow without the membrane collapsing and without blocking flow through portions of the membrane, resulting in high throughput. Thus, the pore structure of this portion of the membrane (e.g., the "upstream layer") can be "tuned."

Additionally, the more downstream portion of the membrane, the second porous portion (e.g., the "downstream layer") has a third set of controlled pore structures produced by phase inversion without the presence of fibers, providing a smaller pore structure than that of the second set of controlled pore structures, such that the downstream portion provides the more retentive portion of the membrane. For example, the more downstream portion of the membrane can have a bacterial retaining pore size, providing sterile filtration, while the more upstream portion provides for high throughput. Alternatively, in other applications, e.g., for filtering in the food and beverage industry, the more downstream portion of the membrane can have a pore size in the range of from about 0.5 to about 4 micrometers (preferably in the range of about 0.8 micrometers to about 2.5 micrometers), providing efficient filtration, while the more upstream portion provides for high throughput.

In some embodiments, the more upstream portion of the membrane (the first porous portion of the membrane), has at least one additional set of controlled pore structures, produced by the interaction of phase inversion and the fiber surfaces, improving porosity and allowing additional lateral flow through the membrane, further improving throughput.

In other embodiments, methods of making the membranes, methods of using the membranes, and devices including the membranes, are provided by the invention.

In one embodiment, a method of preparing a polymeric membrane comprises (a) casting a first polymer solution comprising fibers on a support; (b) casting a second polymer solution on the first solution, wherein the second polymer solution does not contain the fibers present in the first solution; (c) effecting phase separation of the first solution and the second solution; and (d) removing the fibers to provide a polymeric membrane.

Membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry, filtering fluids for the food and beverage industry, clarification, filtering antibody- and/or protein-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

Each of the components of the invention will now be described in more detail below, wherein like components have like reference numbers.

The membranes can have any suitable pore structures, e.g., pore sizes (for example, as evidenced by bubble point, or by $K_L$ as described in, for example, U.S. Pat. No. 4,340,479, or evidenced by capillary condensation flow porometry), average pore size (e.g., determined by using a scanning electron microscope to magnify a membrane's cross-sectional view and measuring a set of pores using software), mean flow pore (MFP) sizes (e.g., when characterized using a porometer, for example, a Porvair Porometer (Porvair plc, Norfolk, UK), or a porometer available under the trademark POROLUX), pore ratings, pore diameters (e.g., when characterized using the modified OSU F2 test as described in, for example, U.S. Pat. No. 4,925,572), or removal ratings that reduce or allow the passage therethrough of one or more materials of interest as the fluid is passed through the porous media. In some embodiments, the first controlled pore structure can have a defined aspect ratio of length to diameter. The pore structures provided depend on the size(s) of the particles to be utilized, the composition of the fluid to be treated, and the desired effluent level of the treated fluid.

As noted above, the membrane will have at least first and second porous portions each portion having different controlled pore structures, the first porous portion having larger pore structures than the second porous portion (typically, wherein the first porous portion has at least first and second sets of different controlled pore structures, and the second porous portion has a third set of controlled pore structures), wherein the larger pore structures (the first set of controlled pore structures (channels), which may include first and second subsets of controlled pore structures) are preferably produced by introducing fibers while the membrane is being formed, and subsequently removing the fibers, e.g., by leaching. In some embodiments, the first set of controlled pore structures comprises at least first and second subsets of controlled pore structures, wherein the first subset of controlled pore structures is larger than the second subset of controlled pore structures, preferably, wherein the second subset of controlled pore structures in the first porous portion has a larger pore structure than the third set of controlled pore structures in the second porous portion.

In some embodiments, the first porous portion has at least one additional set of controlled pore structures, the additional set having a smaller average pore size than the second set of controlled pore structures in the first porous portion.

As noted above, the first set of controlled pore structures in the first porous portion is preferably produced by introducing fibers while the membrane is being formed, and subsequently removing the fibers. Preferably, the second set of controlled pore structures in the first porous portion, and the third set of controlled pore structures in the second porous portion, are formed by phase inversion. In those embodiments wherein the first porous portion has at least one additional set of controlled pore structures, the additional set is formed by the interaction between phase inversion and the surfaces of the dissolvable fibers.

A variety of fibers (e.g., dissolvable fibers), fiber dimensions, and fiber concentrations are suitable for use in preparing membranes according to the invention, wherein the fibers are used to prepare the first set of controlled pore structures, including the first and second subsets of the first set of controlled pore structures. Suitable fibers (which include nano fibers) include, for example, polyvinyl alcohol (PVA) fibers, polyester fibers, cellulose acetate fibers, cellulose nitrate fibers, metal nano fibers, such as silver nano fibers.

The fibers can be removed by a variety of processes wherein the membrane is not adversely affected by the removal process. For example, the fibers can be treated with a solvent, wherein the fibers are dissolved. Suitable solvents include, for example, water, one or more alcohols, aromatic solvents (some of which may be alcohols), relatively weak acids (e.g., acetic acid, citric acid, oxalic acid, maleic acid, bases e.g., sodium hydrozide), and combinations thereof).

Typically, the first controlled pore structure (channels) can have a defined aspect ratio of length/diameter, typically, an aspect ratio of at least about 4, for example, in the range of from about 4 to about 20, preferably in the range of from about 5 to about 15. In accordance with a typical embodiment of the invention, the channels have a length greater than the diameter, e.g., as shown in FIGS. 1 and 2, and at least some of the channels can be entangled.

Typically, the second set of controlled pore structures has an average pore size in the range of about 0.5 µm to about 10 µm, more typically, in the range of about 2 µm to about 5 µm.

Typically, the third set of controlled pore structures has an average pore size in the range of about 0.1 µm to about 2 µm. In some embodiments, the third set of controlled pore structures has a bacterial blocking/bacteria retaining pore size, e.g., of about 0.2 µm.

Typically, the additional set of controlled pore structures has an average pore size in the range of about 0.3 µm to about 5 µm.

Typically, membranes according to embodiments of the invention have a thickness in the range of from about 70 µm to about 400 µm.

Preferably, the membrane is prepared by a thermally induced phase inversion process. Typically, the phase inversion process involves casting or extruding polymer solution (s) into thin films, and precipitating the polymers through one or more of the following: (a) evaporation of the solvent and nonsolvent, (b) exposure to a non-solvent vapor, such as water vapor, which absorbs on the exposed surface, (c) quenching in a non-solvent liquid (e.g., a phase immersion bath containing water, and/or another non-solvent), and (d) thermally quenching a hot film so that the solubility of the polymer is suddenly greatly reduced. Phase inversion can be induced by the wet process (immersion precipitation), vapor induced phase separation (VIPS), thermally induced phase separation (TIPS), quenching, dry-wet casting, and solvent evaporation (dry casting). Dry phase inversion differs from the wet or dry-wet procedure by the absence of immersion coagulation. In these techniques, an initially homogeneous polymer solution becomes thermodynamically unstable due to different external effects, and induces phase separation into a polymer lean phase and a polymer rich phase. The polymer rich phase forms the matrix of the membrane, and the polymer lean phase, having increased levels of solvents and non-solvents, forms the pores.

The various pore structures can be controlled by a variety of procedures. The first set of pore structures is typically controlled by one or more of any of the following: fiber size, fiber size distribution, fiber concentration, fiber shape, and casting thickness of the solution(s).

The second and third sets of pore structures are typically controlled by one or more of any of the following process conditions and/or solution compositions: changing the temperature(s) of the solutions and/or in the casting chamber(s), changing the air velocity, changing the air volume, changing the relative humidity of the environment in which the membrane is formed, changing the concentration of the polymer in the solution, changing the concentration of the solvent in the solution, adding one or additives, and changing the molecular weight of the pore former in the solution.

The additional set of pore structures is typically controlled by one or more of any of the following: fiber size, fiber size distribution, fiber physical properties (e.g., surface roughness, hydrophobicity, hydrophilicity), and solution compositions (e.g., the solvent used can affect, for example, the speed at which the fibers dissolve).

The membranes can be cast manually (e.g., poured, cast, or spread by hand onto a casting surface) or automatically (e.g., poured or otherwise cast onto a moving bed). Examples of suitable supports include, for example, polyethylene coated paper, or polyester (such as MYLAR), or a belt such as a stainless steel belt.

A variety of casting techniques, including dual casting techniques, are known in the art and are suitable. A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot. Illustratively, the solutions comprising polymers can be cast by means of a doctor blade with knife gaps in the range from about 120 micrometers to about 500 micrometers, more typically in the range from about 180 micrometers to about 400 micrometers.

A variety of casting speeds are suitable as is known in the art, Typically, the casting speed is at least about 3 feet per minute (fpm), more typically in the range of from about 3 to about 15 fpm, in some embodiments, at least about 7 fpm.

A variety of polymer solutions are suitable for use in the invention, and are known in the art. Suitable polymer solutions can include, polymers such as, for example, polyaromatics; sulfones (e.g., polysulfones, including aromatic polysulfones such as, for example, polyethersulfone, polyether ether sulfone, bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles (including polyalkylacrylonitriles), cellulosic polymers (such as cellulose acetates and cellulose nitrates), fluoropolymers, and polyetherether ketone (PEEK). Polymer solutions can include a mixture of polymers, e.g., a hydrophobic polymer (e.g., a sulfone polymer) and a hydrophilic polymer (e.g., polyvinylpyrrolidone).

In addition to one or more polymers, typical polymer solutions comprise at least one solvent, and may further comprise at least one non-solvent. Suitable solvents include, for example, dimethyl formamide (DMF); N,N-dimethylacetamide (DMAc); N-methyl pyrrolidone (NMP); dimethyl sulfoxide (DMSO), methyl sulfoxide, tetramethylurea; dioxane; diethyl succinate; chloroform; and tetrachloroethane; and mixtures thereof. Suitable nonsolvents include, for example, water; various polyethylene glycols (PEGs; e.g., PEG-200, PEG-300, PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; and various salts, such as calcium chloride, magnesium chloride, and lithium chloride; and mixtures thereof.

If desired, a solution comprising a polymer can further comprise, for example, one or more polymerization initiators (e.g., any one or more of peroxides, ammonium persulfate, aliphatic azo compounds 2,2'-azobis(2-amidinopropane) dihydrochloride (V50)), and combinations thereof), and/or minor ingredients such as surfactants and/or release agents.

Suitable components of solutions are known in the art. Illustrative solutions comprising polymers, and illustrative solvents and nonsolvents include those disclosed in, for example, U.S. Pat. Nos. 4,340,579; 4,629,563; 4,900,449;

4,964,990, 5,444,097; 5,846,422; 5,906,742; 5,928,774; 6,045,899; 6,146,747; and 7,208,200.

In accordance with the invention, the membrane can have a plurality of layers wherein the layers can be formed from the same polymer and solvent, varying the viscosity, additives, and treatment, or different polymers can be used for different layers.

The membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the membrane is hydrophilic, having a CWST of 72 dynes/cm ($72 \times 10^{-5}$ N/cm) or more. In some embodiments, the membrane has a CWST of about 75 dynes/cm (about $75 \times 10^{-5}$ N/cm) or more.

The surface characteristics of the membrane can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van der Graff generator, ultraviolet light, electron beam, or to various other forms of radiation, or by surface etching or deposition using a plasma treatment.

Additionally, or alternatively, the membrane can include, e.g., throughout the membrane or in a portion of the membrane (for example, the first portion of the membrane) can comprise at least one component for providing one or more desired functions and/or characteristics to the resultant membrane, e.g., one or more of the following: a solid such as, for example, sodium bicarbonate or sodium chloride (e.g., that may be leached out resulting in a pore); a component for providing an antimicrobial function, such as a bacteriostatic or bacteriocidal function (for example, by including a silver-based reagent, e.g., silver nitrate); providing a charge such as a negative charge (e.g., for adsorbing negatively charged target entities such as bacteria, mammalian cells, free nucleic acids, proteins (under certain pH environments) and drugs such as heparin); a positive charge (e.g., for adsorbing positively charged target entities such as proteins (under certain pH environments) and drugs such as dopamine); a zwitterion; and a mixed charge; providing a chelation function (e.g., by including a chelating polymer such as polyacrylic acid, polyvinylsulfonic acid, and sulfonated polystyrene, for example, for adsorbing heavy metals); including a dendrimer (e.g., polyamidoamine (PAMAM) for binding pharmaceutically active compounds, including drug metabolites from blood samples); including liposomes (e.g., for carrying/delivering a desired material such as a drug, for example, providing a membrane-based medicinal skin patch); and including a functionalized bead and/or sorbent such as a chromatography sorbent, an affinity sorbet (such as antibodies, antibody fragments, enzymes, e.g., for adsorbing targets such as proteins and/or endotoxins), an activated sorbent (such as activated carbon, activated silica, and activated alumina). Advantageously, by including the component(s) as part of one portion (e.g., layer), the desired function(s) and/or characteristic(s) can be provided, if desired, to a desired portion and/or side of the membrane, rather than throughout the entire membrane. For example, the desired function(s) and/or characteristic(s) can be localized to the portion of the membrane first contacted by the fluid to be treated, or, for example, the portion of the membrane first contacted by the fluid to be treated can have a higher concentration of the desired function(s) or characteristic(s) than the other portions of the membrane surface facing the fluid to be treated. Additionally, for example, a casting solution can be used to provide a membrane with one or more desired functions and/or characteristics.

In those embodiments of the invention comprising a filter comprising at least one filter element comprising at least one membrane according to the invention, the filter can include additional elements, layers, or components, that can have different structures and/or functions, e.g., at least one of prefiltration, support, drainage, spacing and cushioning. Illustratively, the filter can also include at least one additional element such as a mesh and/or a screen.

The present invention further provides a device, e.g., a filter device, chromatography device and/or a membrane module comprising one or more membranes of the present invention disposed in a housing. The device can be in any suitable form. For example, the device can include a filter element comprising the membrane in a substantially planar, pleated, or spiral form. In an embodiment, the element can have a hollow generally cylindrical form. If desired, the device can include the filter element in combination with upstream and/or downstream support or drainage layers. The device can include a plurality of membranes, e.g., to provide a multilayered filter element, or stacked to provide a membrane module, such as a membrane module for use in membrane chromatography.

The filter, in some embodiments comprising a plurality of filter elements, is typically disposed in a housing comprising at least one inlet and at least one outlet and defining at least one fluid flow path between the inlet and the outlet, wherein the filter is across the fluid flow path, to provide a filter device. In another embodiment, the filter device comprises a housing comprising at least one inlet and at least a first outlet and at second outlet, and defining first fluid flow path between the inlet and the first outlet, and a second fluid flow path between the inlet and the second outlet, wherein the filter is across the first fluid flow path, e.g., allowing tangential flow such that the first liquid passes along the first fluid flow path from the inlet through the filter and through the first outlet, and the second fluid passes along the second fluid flow path from the inlet and through the second outlet without passing through the filter. Filter cartridges can be constructed by including a housing and endcaps to provide fluid seal as well as at least one inlet and at least one outlet.

In some embodiments, the filter device is sterilizable. Any housing of suitable shape and providing at least one inlet and at least one outlet may be employed. The housing can be fabricated from any suitable rigid impervious material, including any impervious thermoplastic material, which is compatible with the biological fluid being processed. For example, the housing can be fabricated from a metal, such as stainless steel, or from a polymer. In a preferred embodiment, the housing is a polymer, in some embodiments, a transparent or translucent polymer, such as an acrylic, polypropylene, polystyrene, or a polycarbonated resin. Such a housing is easily and economically fabricated, and allows observation of the passage of the fluid through the housing.

The following examples further illustrate the invention but, of course, should not be construed as in any way limiting its scope.

Example 1

This example demonstrates preparation of a membrane according to an embodiment of the invention.

A first solution consisting of 67.57 g PEG400; 0.6 g PEG400 Dimethacrylate (PEG DM); 0.1 g HEMA (hydroxylethylmethacrylate), 0.1 g Trimethylolpropane trimethacrylate (TMPTMA; Aldrich Chemical Co., Milwaukee, Wis.); 0.05 g 2,2'-Azobis(2-Amidinopropane) Dihydrochloride (V50) (Wako Chemical, Richmond, Va.); 2.0 DI water, 12.0 g PES, 11.0 g DMF, 6.6 g NMP, and 0.4 g PVA fibers is cast on a flat glass plate at a casting speed of 1.1 inch/sec, using a first casting knife having a knife gap of 10 mils.

A second solution consisting of 67.57 g PEG400; 0.6 g PEG DM 400; 0.1 g HEMA; 0.1 g TMPTMA (PTA; Aldrich Chemical Co., Milwaukee, Wis.), 0.05 g (V50) (Wako Chemical, Richmond, Va.); 2.0 DI water, 12.0 g PES, 11.0 g DMF, 6.6 g NMP, is continuously cast on the first solution, at a casting speed of about 1.1 inch/sec, using a second knife having a knife gap of 15 mils, so that the second solution has a thickness of 5 mils. The time between the two castings is about 1 second. The temperature is 29.4° C.

The glass plate is moved into an environmental chamber for 10 minutes at 70% relative humidity, 5 feet/min air velocity, at 21° C. air temperature. The glass plate temperature is kept at 23.3° C. for 1.3 minutes, then is changed to 43.3° C. for 3.7 minutes, then is changed to 23.3° C. for 1 minute, and is finally changed to 35° C. for 4 minutes.

The wet membrane is soaked in 80° C. DI water for 8 hours and the fibers are leached out.

The membrane is rinsed with DI water 3-5 times, each time for 1-3 minutes, followed by rinsing in 40% ethanol for 30 minutes, followed by rinsing in DI water at 80° C. for 30 minutes, and drying in an oven at 65° C. for 30 minutes.

Figure 1A:
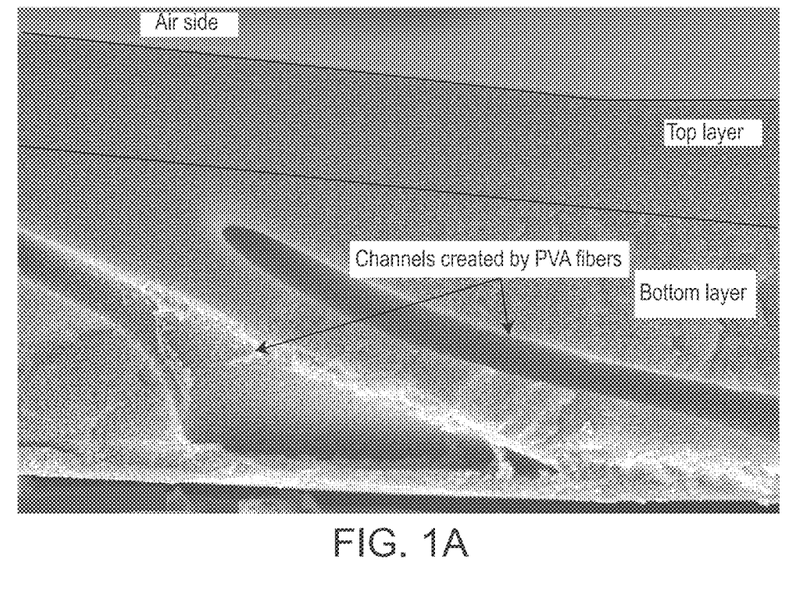
FIG. 1A shows a first portion having a first set of controlled pore structures comprising channels (shown in longitudinal view), and a second set of controlled pore structures, and a second portion having a third set of controlled pore structures, wherein the third set of controlled pore structures has a smaller average pore size than the second set of controlled pore structures.

SEM cross-sectional views of the membrane are shown in FIG. 1. FIG. 1A shows a first porous portion comprising a first set of controlled pore structures (channels) and a second set of controlled pore structures (the first porous portion is labeled "bottom layer"), and a symmetric second porous portion comprising a third set of controlled pore structures (labeled "top layer"), wherein the average pore size of the third set of controlled pore structures is less than the average pore size of the second set of controlled pore structures. The membrane is 200 μm in thickness, and the first porous portion and the second porous portions have thicknesses of 75 μm and 125 μm, respectively. The channels range in length from about 39 μm to about 140 μm, having diameters ranging from about 4 μm to about 40 μm.

Figure 1B:
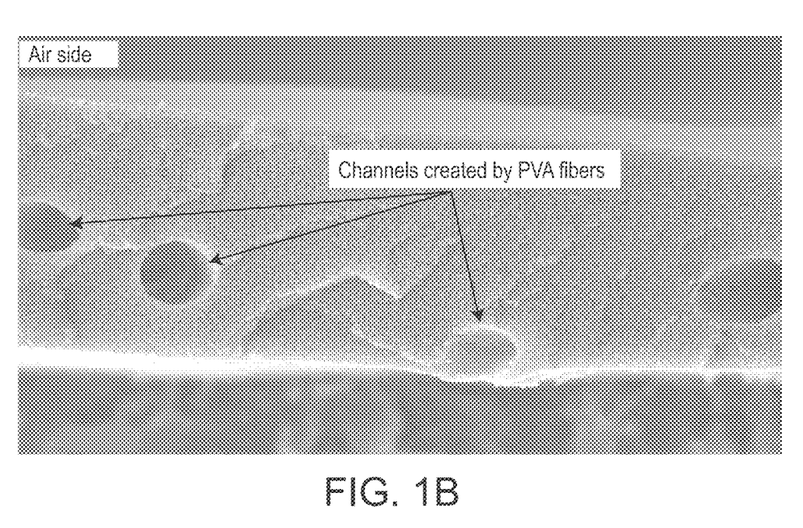
FIG. 1B shows views of channels perpendicular to the views of the channels shown in FIG. 1A.

FIG. 1B shows, in a view of channels generally perpendicular to the view of channels shown in FIG. 1A, the channels from another angle.

The CWST is in the range of about 82 to about 88 dynes/cm.

Example 2

This example demonstrates preparation of a membrane according to another embodiment of the invention.

A first solution consisting of 74.57 g PEG400; 0.6 g PEG DM 400; 0.11 g HEMA; 0.1 g TMPTMA (PTA; Aldrich Chemical Co., Milwaukee, Wis.), 0.05 g (V50) (Wako Chemical, Richmond, Va.); 2.0 DI water, 5.0 g PES, 11.0 g DMF, 6.6 g NMP, and 0.4 g PVA, is cast on a flat glass plate at a casting speed of 1.1 inch/sec, using a first casting knife having a knife gap of 10 mils.

A second solution consisting of 67.57 g PEG400; 0.6 g PEG DM 400; 0.1 g HEMA; 0.1 g TMPTMA (PTA; Aldrich Chemical Co., Milwaukee, Wis.), 0.05 g (V50) (Wako Chemical, Richmond, Va.); 2.0 DI water, 12.0 g PES, 11.0 g DMF, 6.6 g NMP, is continuously cast on the first solution, at a casting speed of about 1.1 inch/sec, using a second knife having a knife gap of 15 mils, so that the second solution has a thickness of 5 mils. The time between the two castings is about 1 second. The temperature is 29.4° C.

The glass plate is moved into an environmental chamber for 110 minutes at 70% relative humidity, 5 feet/min air velocity, at 21° C. air temperature. The glass plate temperature is kept at 23.3° C. for 1.3 minutes, then is changed to 43.3° C. for 3.7 minutes, then is changed to 23.3° C. for 1 minute, and is finally changed to 35° C. for 4 minutes.

The wet membrane is soaked in 80° C. DI water overnight and the fibers are leached out.

The membrane is rinsed with DI water 3-5 times, each time for 1-3 minutes, followed by rinsing in 40% ethanol for 30 minutes, followed by rinsing in DI water at 80° C. for 30 minutes, and drying in an oven at 65° C. for 30 minutes.

Figure 2A:
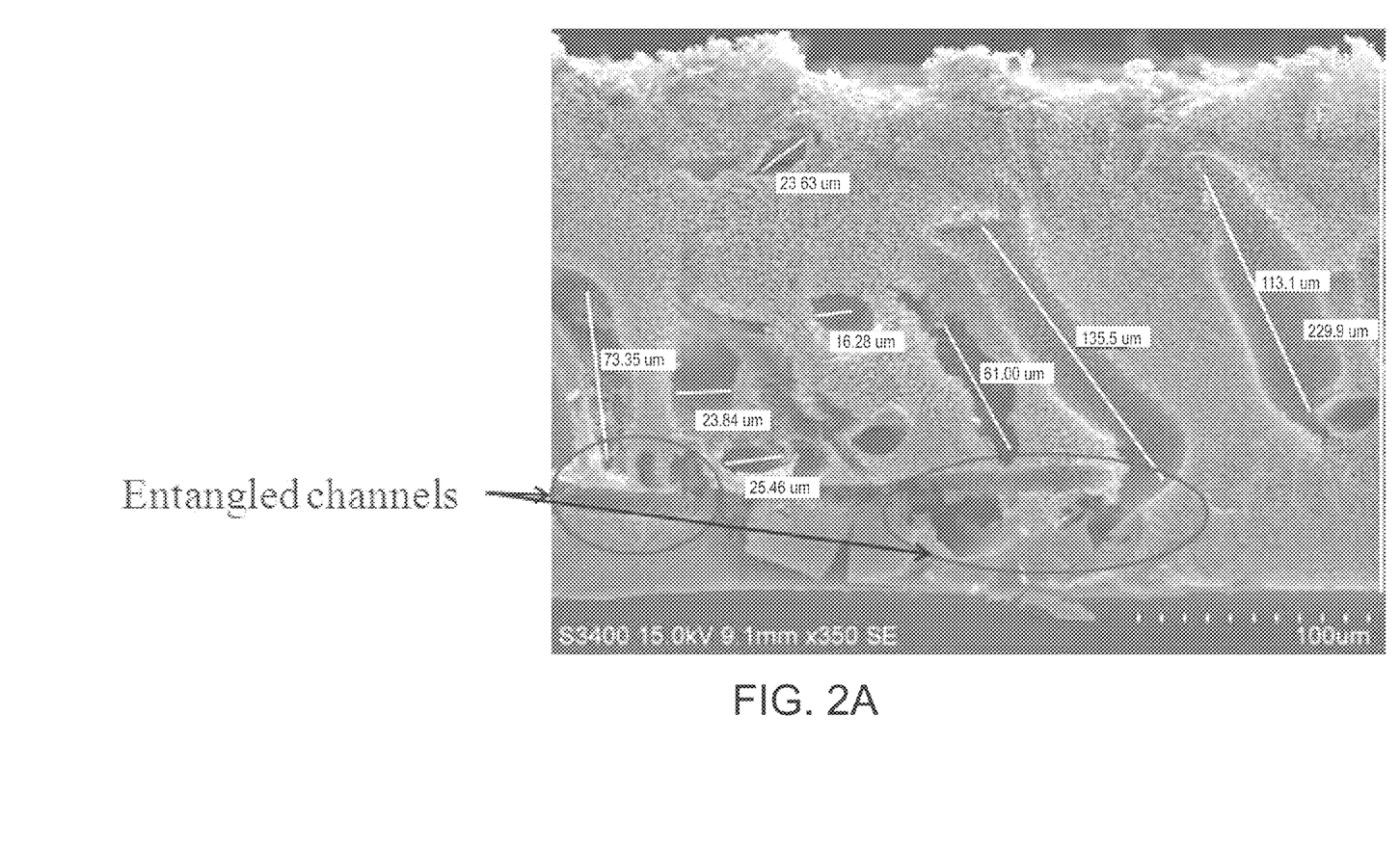
FIG. 2A also shows channels having an aspect ratio of length to diameter of at least about 4.
Figure 2B:
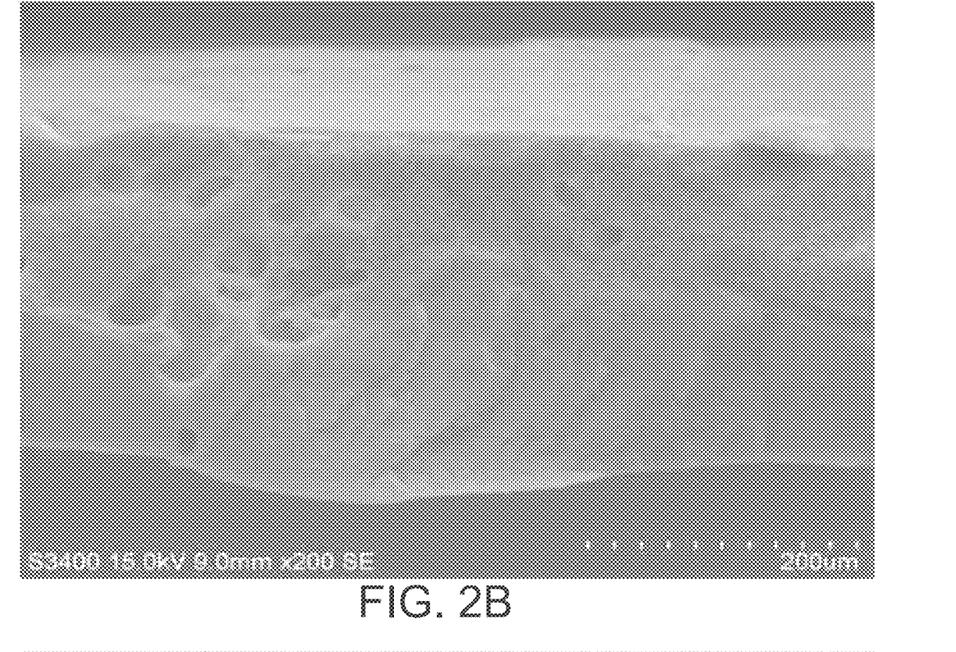
FIGS. 2B and 2C show views of channels generally perpendicular to the views of channels shown in FIG. 2A.
Figure 2C:
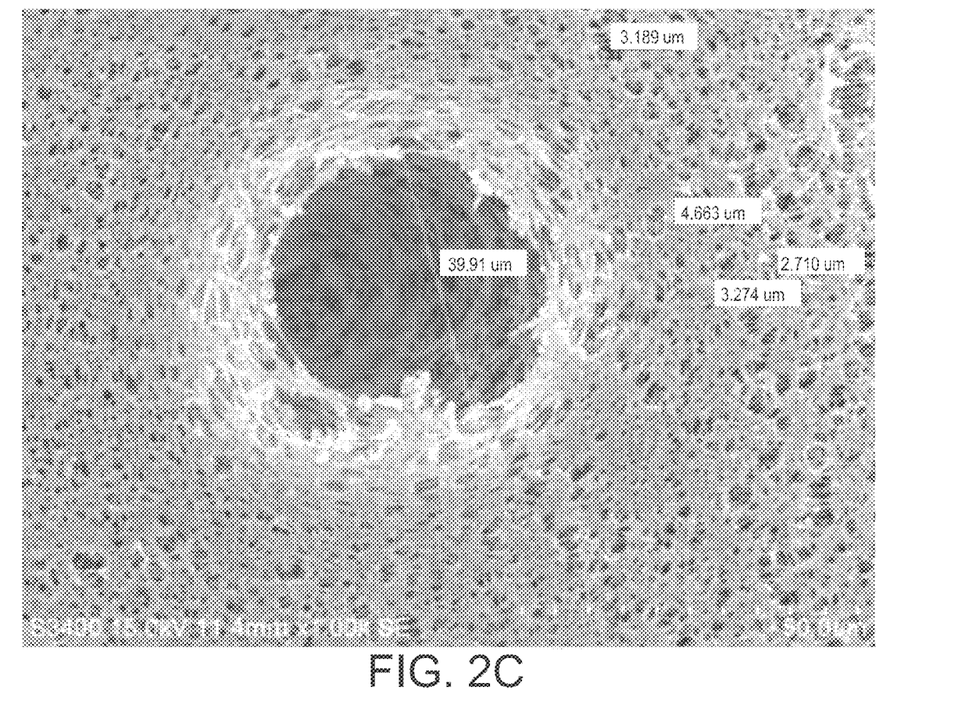

The SEM shown in FIG. 2C shows the diameter of a channel in the membrane. The membrane has a symmetric portion (second porous portion) 30 μm thick and a heterogeneous structure (first porous portion) 40 μm thick. The membrane is 70 μm in thickness.

The membrane has a CWST of about 82 to about 88 dynes/cm, a bubble point of 62.88 psi, and a water flow rate of 27.4 ml·min$^{-1}$·cm$^{-2}$.

Example 3

This example demonstrates the throughput of a membrane according to an embodiment of the invention (prepared as described in Example 2).

A 1% treacle solution is prepared (5 grams treacle (Lyle's black Treacle, Notts, UK); dissolved in 495 grams deionized water (DI)). The membrane is placed in a test cell (on top of a 0.2 μm pore size rated isotropic hydrophilic membrane) the test system is purged, and the throughput is determined at 10 psi for 5 minutes.

The membrane has a 1% treacle throughput of 38 mL.

Example 4

This example demonstrates preparation of a membrane according to another embodiment of the invention.

A first solution consisting of 69.57 g PEG400; 0.6 g PEG DM 400; 0.1 g HEMA; 0.1 g TMPTMA (PTA; Aldrich Chemical Co., Milwaukee, Wis.), 0.05 g (V50) (Wako Chemical, Richmond, Va.); 2.0 DI water, 9.0 g PES, 11.0 g DMF, 6.6 g NMP, and 0.4 g PVA, is cast on a flat glass plate at a casting speed of 1.1 inch/sec, using a first casting knife having a knife gap of 10 mils.

A second solution consisting of 67.57 g PEG400; 0.6 g PEG DM 400; 0.1 g HEMA; 0.1 g TMPTMA (PTA; Aldrich Chemical Co., Milwaukee, Wis.), 0.05 g (V50) (Wako Chemical, Richmond, Va.); 2.0 DI water, 12.0 g PES, 11.0 g DMF, 6.6 g NMP, is continuously cast on the first solution, at a casting speed of about 1.1 inch/sec, using a second knife having a knife gap of 15 mils, so that the second solution has a thickness of 5 mils. The time between the two castings is about 1 second. The temperature is 29.4° C.

The glass plate is moved into an environmental chamber for 10 minutes at 70% relative humidity, 5 feet/min air velocity, at 21° C. air temperature. The glass plate temperature is kept at 23.3° C. for 1.3 minutes, then is changed to 43.3° C. for 3.7 minutes, then is changed to 23.3° C. for 1 minute, and is finally changed to 35° C. for 4 minutes.

The wet membrane is soaked in 80° C. DI water overnight and the fibers are leached out.

The membrane is rinsed with DI water 3-5 times, each time for 1-3 minutes, followed by rinsing in 40% ethanol for 30 minutes, followed by rinsing in DI water at 80° C. for 30 minutes, and drying in an oven at 65° C. for 30 minutes.

SEM cross-sectional views of the membrane are shown in FIGS. 2A and 2B (also showing entangled channels in the first porous portion) wherein FIG. 2A shows the channels have an aspect ratio of length to diameter of at least about 4. FIG. 2B shows a symmetric portion (second porous portion) 50 μm thick and a heterogeneous structure (first porous portion) 200 μm thick. The membrane is 250 μm in thickness. FIG. 2B also shows a view of the channels generally perpendicular to the view of the channels shown in FIG. 2A.

The membrane has a MST of about 82 to about 88 dynes/cm, and a water flow rate of 19.5 mL·min$^{-1}$·cm$^{-2}$.

Example 5

This example demonstrates the throughput of a membrane according to an embodiment of the invention (prepared as described in Example 4).

A 1% treacle solution is prepared (5 grams treacle (Lyle's black Treacle, Notts, UK); dissolved in 495 grams deionized water (DI). The membrane is placed in a test cell (on top of a 0.2 μm pore size rated isotropic hydrophilic membrane) the test system is purged, and the throughput is determined at 10 psi for 5 minutes.

The membrane has a 1% treacle throughput of 47 mL.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A polymeric microporous filtration membrane comprising:
   (a) a first microporous surface;
   (b) a second microporous surface; and
   (c) first and second layers integrally bonded to one another, the first layer including the first microporous surface and having a first layer thickness, and the second layer comprising the second microporous surface and having a second layer thickness; and
     (i) the first layer comprises at least first and second sets of different controlled pore structures, and at least one additional set of controlled pore structures, the additional set of pore structures having a smaller average pore size than the second set of pore structures, the additional set of pore structures having an average pore size in the range of about 0.3 μm to about 5 μm, the first set of controlled pore structures comprising channels comprising an aspect ratio of length/diameter of at least about 4, wherein the first and second sets of different controlled pore structures, and the additional set of pore structures, are intermixed within the first layer thickness; and
     (ii) the second layer comprises a third set of controlled pore structures, wherein the third set of pore structures has a smaller average pore size than the second set of pore structures, wherein the third set of controlled pore structures has an average pore size of at least about 0.1 μm, wherein the second layer does not include controlled pore structures comprising channels in the second layer thickness.

2. The membrane of claim 1, wherein the first set of controlled pore structures are prepared by introducing fibers, and leaching the fibers, and forming the first layer.

3. The membrane of claim 1, wherein the channels comprise an aspect ratio of length/diameter in the range of about 5 to about 20.

4. The membrane of claim 1, wherein the second set of controlled pore structures has an average pore size in the range of about 0.5 μm to about 10 μm.

5. The membrane of claim 1, wherein the third set of controlled pore structures has an average pore size in the range of about 0.1 μm to about 2 μm.

6. The membrane of claim 5, wherein the third set of controlled pore structures has a bacterial blocking pore size of about 0.2 μm.

7. A method of filtering a fluid, the method comprising passing the fluid through the membrane of claim 1.

8. A method of preparing the polymeric microporous filtration membrane of claim 1 comprising:
   (a) casting a first polymer solution comprising fibers on a support;
   (b) casting a second polymer solution on the first solution, wherein the second polymer solution does not contain the fibers present in the first solution;
   (c) effecting phase separation of the first solution and the second solution; and
   (d) removing the fibers to provide a polymeric membrane having first and second layers integrally bonded to one another, the first layer including the first microporous surface and having a first layer thickness, and the second layer comprising the second microporous surface and having a second layer thickness, wherein the first layer has channels comprising an aspect ratio of length/diameter of at least about 4 in the first layer thickness and wherein the first layer thickness includes the first and second sets of different controlled pore structures, and the additional set of pore structures, intermixed within the first layer thickness.

9. A method of filtering a fluid, the method comprising passing the fluid through the membrane of claim 5.

10. A method of filtering a fluid, the method comprising passing the fluid through the membrane of claim 3.

* * * * *